(12) United States Patent
Tang

(10) Patent No.: US 11,490,765 B2
(45) Date of Patent: Nov. 8, 2022

(54) MEDICINE GRINDER

(71) Applicant: E-LINK PLASTIC & METAL INDUSTRIAL CO., LTD., New Taipei (TW)

(72) Inventor: Wen Hai Tang, New Taipei (TW)

(73) Assignee: E-LINK PLASTIC & METAL INDUSTRIAL CO., LTD., New Taipei (TW)

( * ) Notice: Subject to any disclaimer, the term of this patent is extended or adjusted under 35 U.S.C. 154(b) by 560 days.

(21) Appl. No.: 16/732,423

(22) Filed: Jan. 2, 2020

(65) Prior Publication Data
US 2021/0205177 A1   Jul. 8, 2021

(51) Int. Cl.
| A61J 7/00 | (2006.01) |
| A47J 42/10 | (2006.01) |
| B02C 23/02 | (2006.01) |
| B02C 2/10 | (2006.01) |

(52) U.S. Cl.
CPC ............ *A47J 42/10* (2013.01); *A61J 7/0007* (2013.01); *B02C 2/10* (2013.01); *B02C 23/02* (2013.01)

(58) Field of Classification Search
CPC ............ A61J 7/0007; A47J 42/10; B02C 2/10
See application file for complete search history.

(56) References Cited

U.S. PATENT DOCUMENTS

| 4,237 A * | 10/1845 | Scudder | B02C 2/10 |
| | | | 241/261.1 |
| 782,372 A * | 2/1905 | Warner | B02C 2/10 |
| | | | 241/258 |
| 2,886,253 A * | 5/1959 | Skibicki | A61J 7/0007 |
| | | | 241/245 |
| 4,026,490 A * | 5/1977 | Johansson | A47J 42/04 |
| | | | 241/169.1 |
| 4,765,549 A * | 8/1988 | Sherman | A61J 7/0007 |
| | | | D24/220 |
| 6,196,481 B1 * | 3/2001 | Barbagli | A47J 42/10 |
| | | | 241/169.1 |
| 6,224,005 B1 * | 5/2001 | Wu | A47J 42/10 |
| | | | 241/169.1 |
| 6,378,794 B1 * | 4/2002 | Wu | A47J 42/10 |
| | | | 241/168 |
| 6,449,218 B1 * | 9/2002 | Lluch | A61J 7/0481 |
| | | | 368/69 |
| 7,735,763 B2 * | 6/2010 | Bell | A61J 7/0007 |
| | | | 241/169.1 |

(Continued)

*Primary Examiner* — Faye Francis
(74) *Attorney, Agent, or Firm* — Alan D. Kamrath; Karin L. Williams; Mayer & Williams PC

(57) ABSTRACT

A medicine grinder has a grinding assembly having a ring burr and a frustoconical burr being mutually rotatable relative to each other. The ring burr is tubular. The frustoconical burr is disposed within the ring burr and has multiple rough grinding edges, multiple recesses, and a non-grinding portion. The multiple rough grinding edges surround a center of the frustoconical burr. Each one of the grinding edges spirally extends about the center of the frustoconical burr. The multiple recesses are divided by the multiple rough grinding edges. One of the multiple recesses has a capacity being larger than a capacity of each one of the other recesses to define a non-grinding portion. Therefore, multiple receiving spaces are formed between the frustoconical burr and the ring burr.

20 Claims, 10 Drawing Sheets

(56) References Cited

U.S. PATENT DOCUMENTS

| | | | |
|---|---|---|---|
| 7,793,874 B2* | 9/2010 | Pai | A47J 42/04 241/168 |
| 7,878,437 B2* | 2/2011 | Rice | A47J 42/08 241/189.1 |
| 11,166,878 B2* | 11/2021 | Macy, Jr. | A61J 3/02 |
| 2002/0117567 A1* | 8/2002 | Lee | A47J 42/04 241/169.1 |
| 2003/0150297 A1* | 8/2003 | Mazur | A61J 7/0007 81/3.09 |
| 2008/0223893 A1* | 9/2008 | Petrie | B26F 3/002 225/89 |
| 2009/0072059 A1* | 3/2009 | Bell | B02C 19/08 241/168 |
| 2009/0084878 A1* | 4/2009 | Wang Wu | A47J 42/04 241/169.1 |
| 2009/0134255 A1* | 5/2009 | Tang | B02C 2/10 241/294 |
| 2012/0006922 A1* | 1/2012 | Wilson | A47J 42/08 241/293 |
| 2014/0217221 A1* | 8/2014 | Hohl | A61J 7/0007 264/153 |
| 2016/0015214 A1* | 1/2016 | Lægdsgaard | A47J 42/10 241/257.1 |
| 2016/0045071 A1* | 2/2016 | Sahli | A47J 42/20 241/261.2 |
| 2016/0354282 A1* | 12/2016 | Macy, Jr. | A61J 3/002 |
| 2019/0240114 A1* | 8/2019 | Arric | A61J 7/0463 |
| 2020/0000285 A1* | 1/2020 | Jana | A47J 42/08 |
| 2020/0197945 A1* | 6/2020 | Gou | A47J 42/10 |
| 2022/0000313 A1* | 1/2022 | Fries | A47J 42/40 |
| 2022/0015990 A1* | 1/2022 | Newsom | A61J 1/03 |
| 2022/0226196 A1* | 7/2022 | Hadad | A61J 7/0007 |

* cited by examiner

MEDICINE GRINDER

BACKGROUND OF THE INVENTION

1. Field of the Invention

The present invention relates to a medical device for grinding medicine, and more particularly to a medicine grinder that can promote grinding efficiency and facilitate ease in cleaning.

2. Description of Related Art

Except traditional Chinese herbal medicine, medicine is normally manufactured as tablets for patients to swallow. However, children or patients with dysphagia have difficulty swallowing some large tablets. Therefore, a medicine grinder is applied to grind tablets into powders for easy swallowing.

A conventional medicine grinder has a ring burr and a frustoconical bur mounted within the ring burr and being rotatable relative to the ring burr. The ring burr has multiple rough grinding teeth and multiple fine grinding teeth formed on an inner surface of the ring burr. The frustoconical bur has multiple rough grinding edges and multiple fine grinding edges. There are multiple receiving spaces formed between the multiple rough grinding edges and the ring burr for receiving the tablets. When the ring burr and the frustoconical burr rotate mutually relative to each other, tablets inserted into the receiving spaces are ground into powder.

However, the multiple grinding edges of the conventional medicine grinder are arranged at equi-angular intervals. Capacities of the multiple receiving spaces are equal. When the tablets are evenly distributed in the multiple receiving spaces with equal capacities, the falling tablets that continuously enter the ring burr are accumulated. Accordingly, the mutual rotation of the ring burr and the frustoconical burr becomes unsmooth. Hence the conventional medicine grinder has a drawback of low grinding efficiency.

Meanwhile, the conventional medicine grinder cannot be easily disassembled for cleaning. Powders of different medicines remain in the conventional grinder and causes a problem of mixing drugs. Sometimes, drug interaction of the mixing drugs may negatively influence the human body. Consequently, how to improve structure of the conventional grinder to make it easily disassembled for cleaning is also a crucial aspect that the manufacturers of medicine grinders endeavor to work on.

To overcome the shortcomings of the conventional medicine grinder, the present invention provides a medicine grinder to mitigate or obviate the aforementioned problems.

SUMMARY OF THE INVENTION

A medicine grinder in accordance with the present invention comprises a grinding assembly having a ring burr and a frustoconical burr being mutually rotatable relative to each other. The ring burr is tubular. The frustoconical burr is disposed within the ring burr and has multiple rough grinding edges, multiple recesses, and a non-grinding portion. The multiple rough grinding edges surround a center of the frustoconical burr. The multiple recesses are divided by the multiple rough grinding edges. One of the multiple recesses has a capacity being larger than a capacity of each one of other recesses to define a non-grinding portion. Therefore, there are multiple receiving spaces formed between the frustoconical burr and the ring burr.

Other objects, advantages, and novel features of the invention will become more apparent from the following detailed description when taken in conjunction with the accompanying drawings.

DETAILED DESCRIPTION OF PREFERRED EMBODIMENTS

Figure 1:
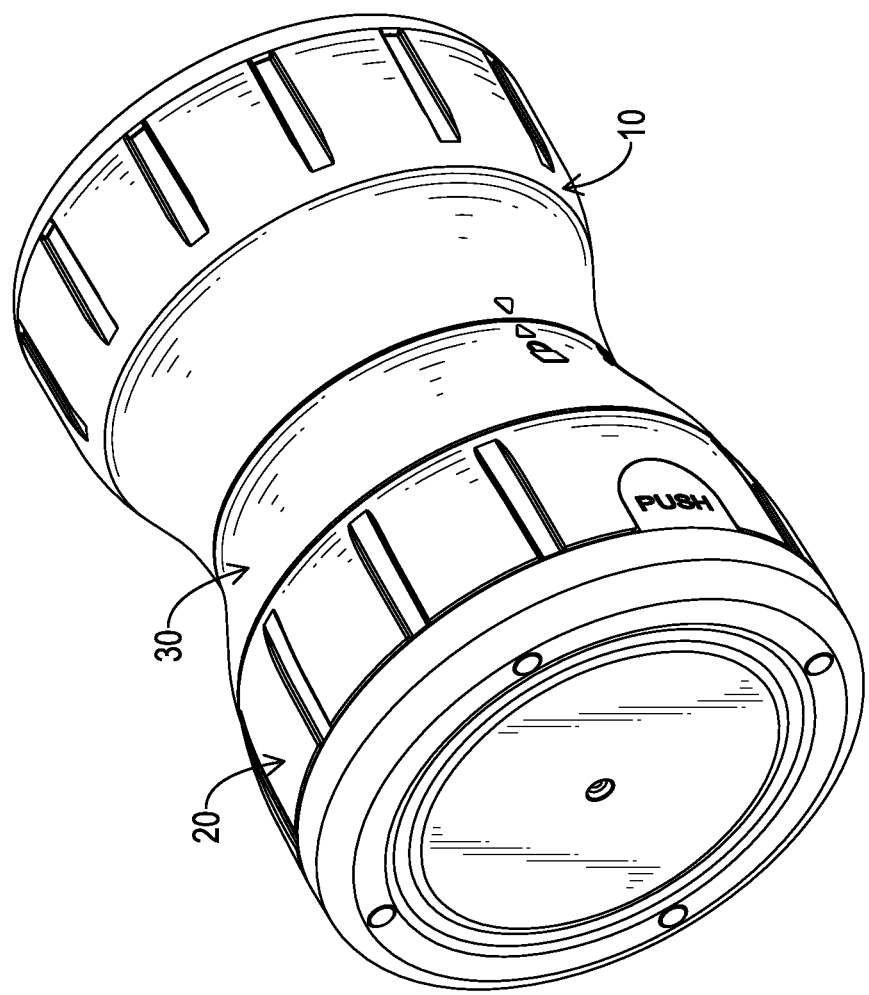
FIG. 1 is a perspective view of a medicine grinder in accordance with the present invention.
Figure 2:
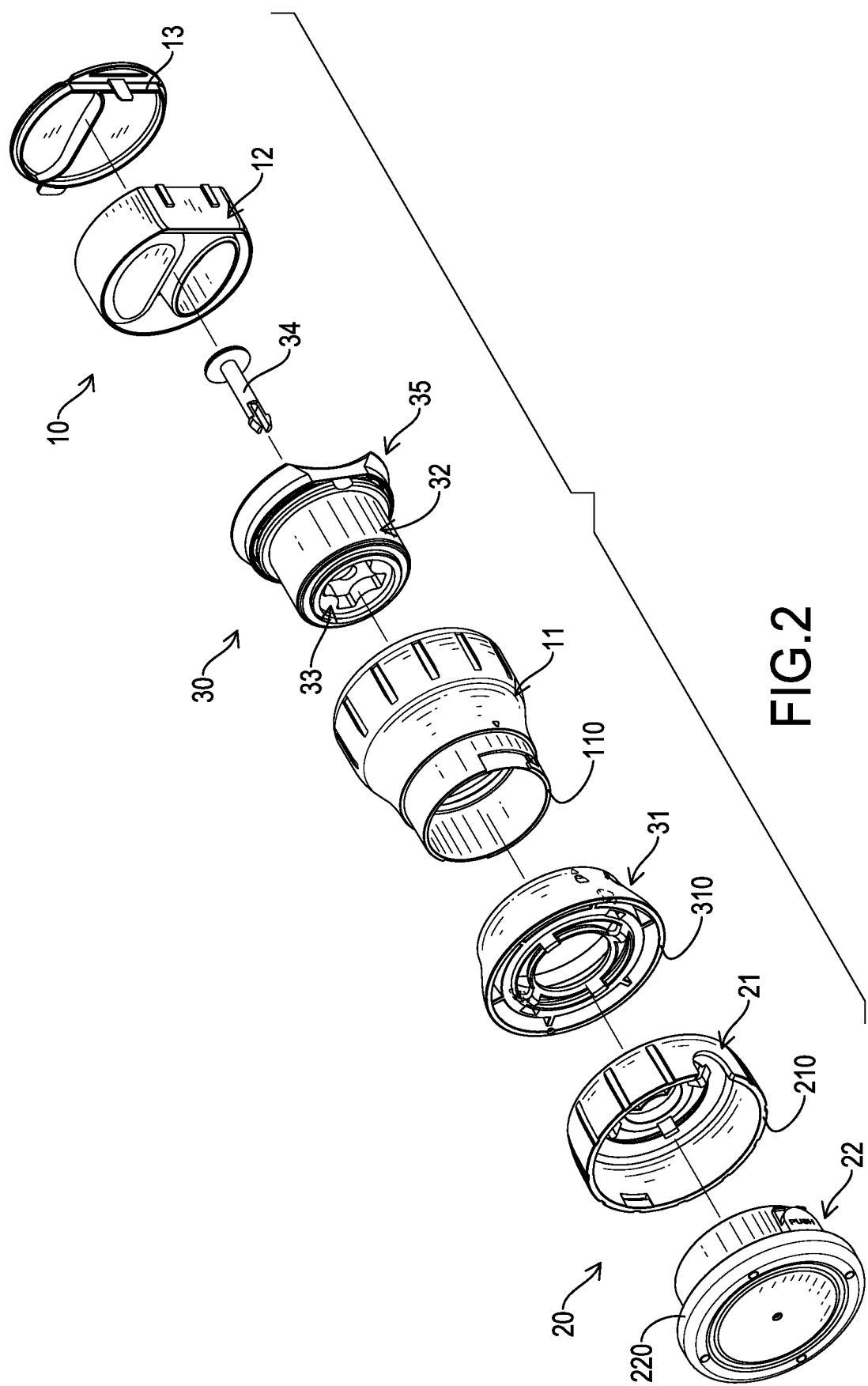
FIG. 2 is an exploded perspective view of the medicine grinder in FIG. 1.

With reference to FIGS. 1 and 2, a medicine grinder in accordance with the present invention has an inlet assembly 10, a collecting assembly 20, and a grinding assembly 30. The inlet assembly 10 is disposed at a top of the medicine grinder. The collecting assembly 20 is disposed at a bottom of the medicine grinder. The grinding assembly 30 is disposed between the inlet assembly 10 and the collecting assembly 20.

Figure 3:
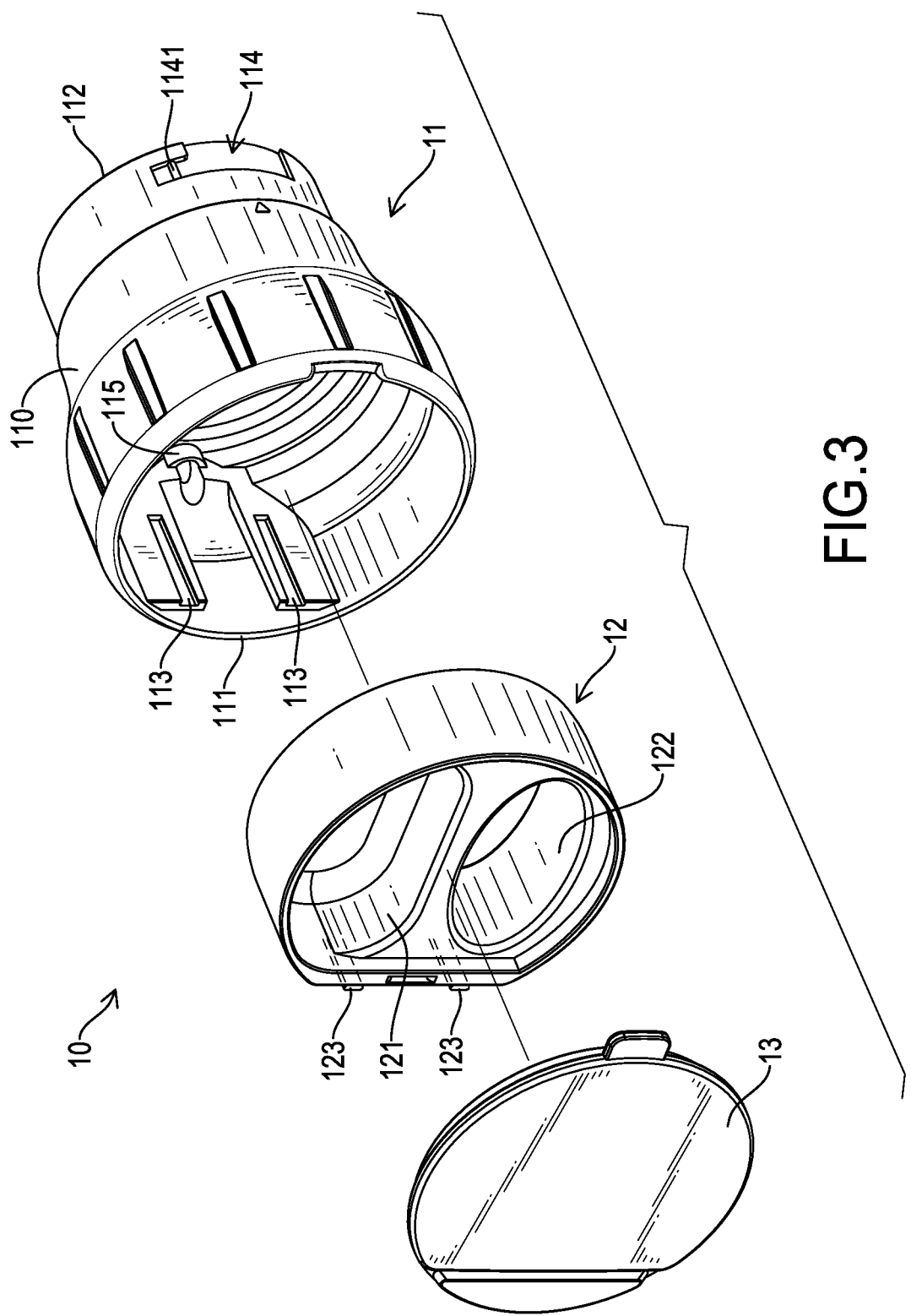
FIG. 3 is an exploded perspective view of an inlet assembly of the medicine grinder in FIG. 1.
Figure 5:
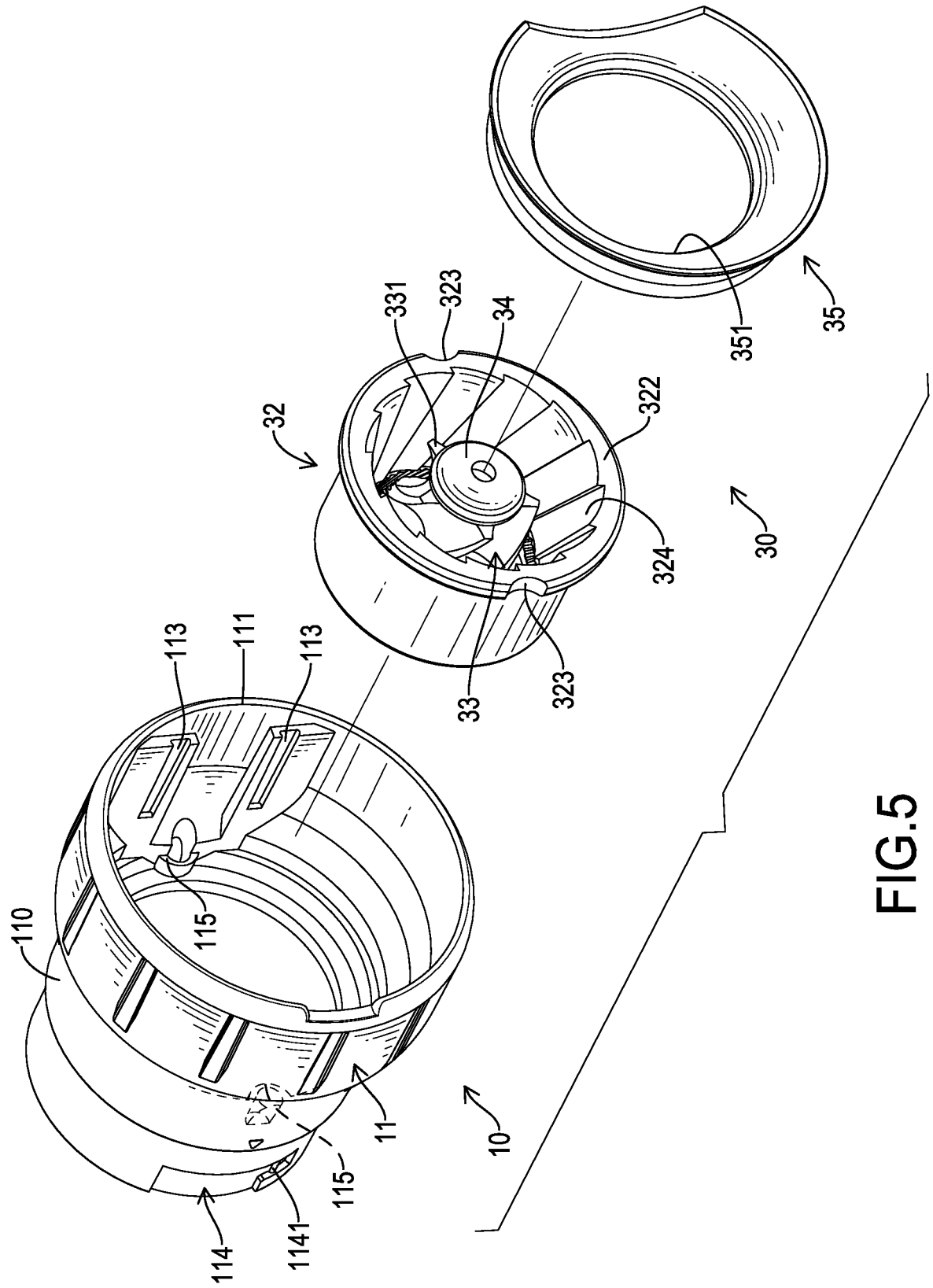
FIG. 5 is a partially exploded perspective view of a grinding assembly of the medicine grinder in FIG. 1.

With reference to FIGS. 2, 3, and 5, the inlet assembly 10 has an upper shell 11 and a medicine case 12. The upper shell 11 is hollow and has an upper shell body 110, two engaging grooves 113, two locking troughs 114, and two engaging protrusions 115. The upper shell body 110 is tubular and has an inner surface, an outer surface, an upper opening end 111, and a lower opening end 112. The upper opening end 111 and the lower opening end 112 of the upper shell body 110 are opposite each other. The upper shell body 110 tapers gradually from the upper opening end 111 to the lower opening end 112 of the upper shell body 110. The two engaging grooves 113 are disposed within the upper shell body 110 and extend from the upper opening end 111 toward the lower opening end 112. Each one of the two locking troughs 114 is defined in the outer surface of the upper shell body 110, curves along a lower opening of the upper shell body 110, and has a locking protrusion 1141 protruding from a bottom face of the locking trough 114. The two locking troughs 114 are diametrically opposite each other on the lower opening end 112 of the upper shell body 110. The two engaging protrusions 115 protrude from the inner surface of the upper shell body 110.

With reference to FIGS. 2 and 3, the medicine case 12 is disposed within the upper shell 11 and has a case body, a medicine trough 121, an inlet 122, and two engaging ribs 123. The medicine trough 121 is formed in the case body of the medicine case 12 and is designed for storing medicines. The inlet 122 is formed through the case body of the medicine case 12 and is disposed aside the medicine trough 121. The two engaging ribs 123 are formed on the case body of the medicine case 12, are disposed outside the case body, and are respectively engaged with the two engaging grooves 113 to hold the medicine case 12 inside the upper shell 11. The inlet assembly 10 further has a cover 13. The cover 13 is connected to the upper opening end 111 of the upper shell body 110 and is capable of blocking an upper opening of the upper shell 11.

Figure 4:
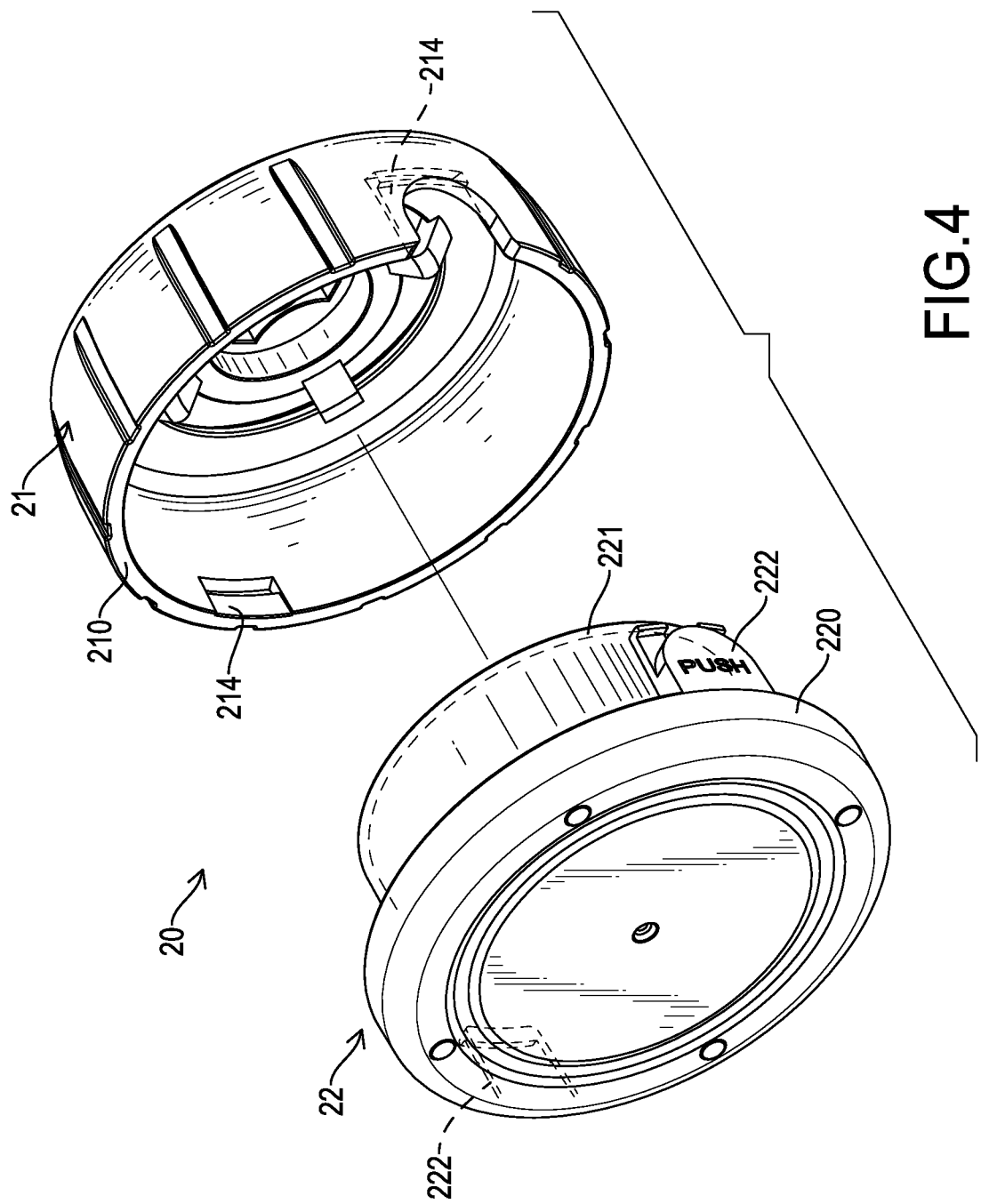
FIG. 4 is an exploded perspective view of a collecting assembly of the medicine grinder in FIG. 1.
Figure 7:
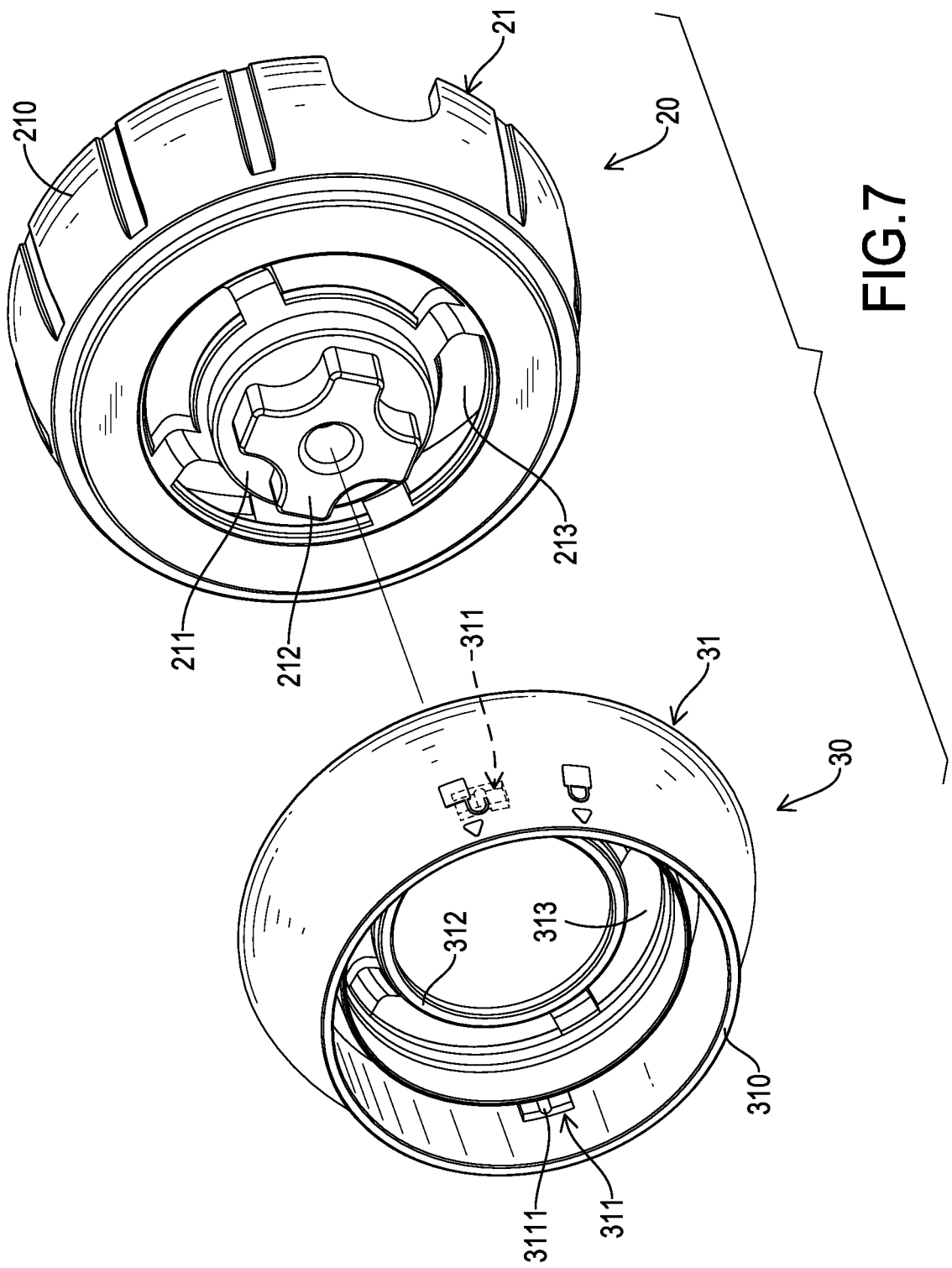
FIG. 7 is a partially exploded perspective view of the collecting assembly and the grinding assembly of the medicine grinder in FIG. 2.

With reference to FIGS. 2, 4, and 7, the collecting assembly 20 has a lower shell 21 and a collecting case 22 covered by the lower shell 21. The lower shell 21 has a lower shell body 210, a positioning pillar 211, an engaging block 212, four communicating holes 213, and two engaging recesses 214. The lower shell body 210 resembles a cap and has a top, a bottom, an inner surface, and an outer surface. The top and the bottom of the lower shell body 210 are opposite each other. The positioning pillar 211 is a cylinder and is disposed at the top of the lower shell body 210. The engaging block 212 is shaped like a crisscross protruding from a top surface of the positioning pillar 211. The four communicating holes 213 are defined through the top of the lower shell body 210 and surround the positioning pillar 211. The two engaging recesses 214 are disposed at the bottom of the lower shell body 210 and are defined in the inner surface of the lower shell body 210. The two engaging recesses 214 are diametrically opposite each other on the lower shell body 210.

With reference to FIGS. 2, 4, and 7, the collecting case 22 has a base 220, a collecting portion 221, and two elastic engaging members 222. The base 220 has a round outline and has a receiving space disposed within the base 220. The collecting portion 221 is tubular and is erectly connected to the base 220. The collecting portion 221 extends into the lower shell body 210 of the lower shell 22. The two elastic engaging members 222 are connected to the base 220, are diametric opposite each other on the base 220, are disposed outside the collecting portion 221, and are respectively engaged with the two engaging recesses 214 of the lower shell 21. The collecting case 22 is detachably connected to the lower shell 22 via the engagement of the elastic engaging members 222 and the engaging recesses 214. Therefore, an interior of the collecting case 22 communicates with the four communicating holes 213 of the lower shell 21.

Figure 6:
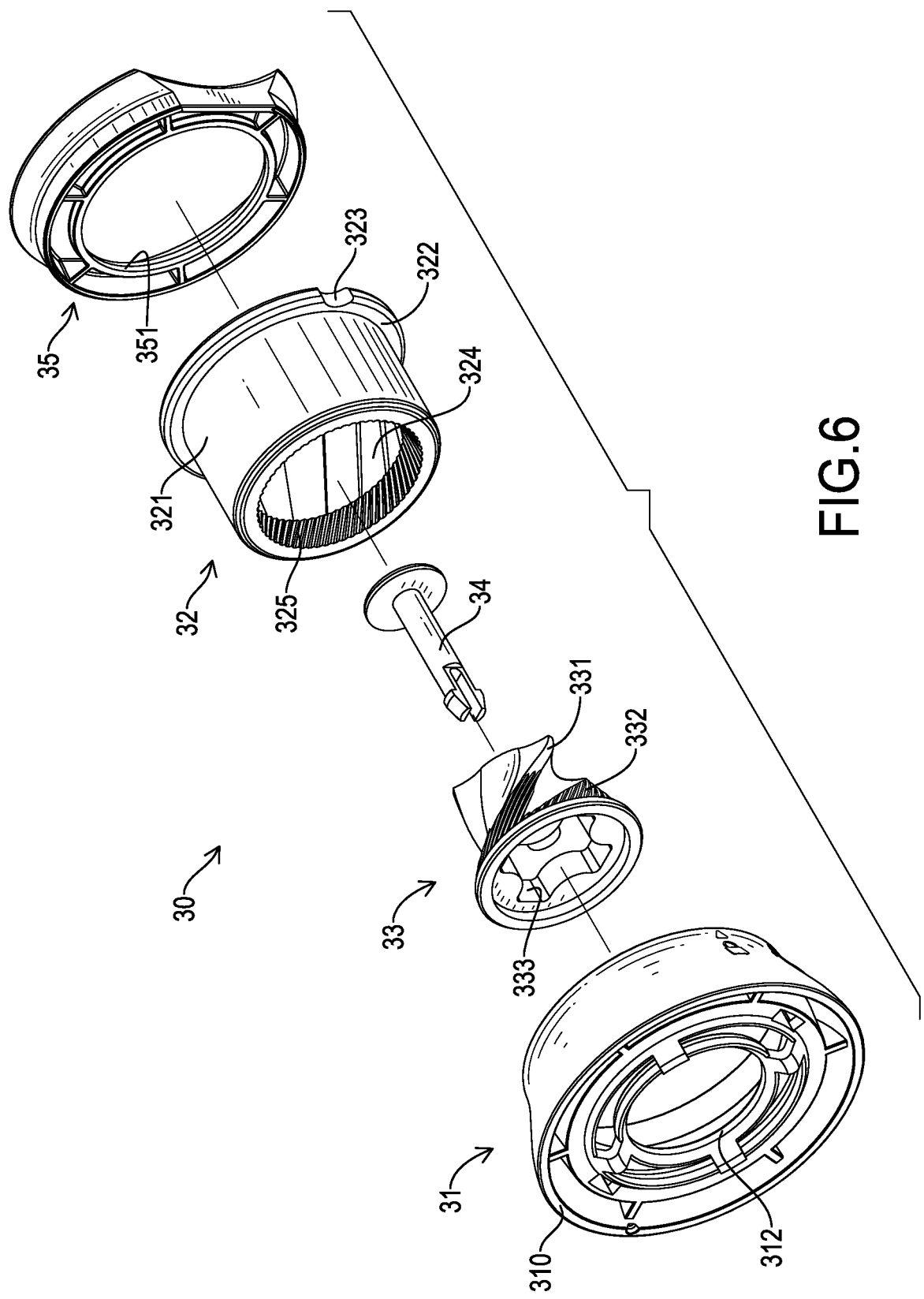
FIG. 6 is an exploded perspective view of the grinding assembly of the medicine grinder in FIG. 1.

With reference to FIGS. 5 to 7, the grinding assembly 30 has a middle shell 31, a ring bur 32, a frustoconical burr 33, a fastener 34, and a guiding disc 35. The middle shell 31 is connected to the lower shell 22 and is rotatable relative to the lower shell 21. The middle shell 31 has a middle shell body 310, two locking blocks 311, a mounting ring 312, and four through holes 313. The middle shell body 310 is tubular, is hollow, and has an inner surface. The two locking blocks 311 protrude from the inner surface of the middle shell body 311 according to positions and contours of the two locking troughs 114. The two locking blocks 311 are diametrically opposite each other on the middle shell body 310. Each one of the two locking blocks 311 has a locking indentation 3111 according to a contour of the locking protrusion 1141 of each locking trough 114. The mounting ring 312 is circular and is disposed within the middle shell body 310. The mounting ring 312 is mounted around the positioning pillar 211 of the lower shell 21. The middle shell 31 is detachably connected to the lower shell 21, and the middle shell 31 and the upper shell 11 fastened to the middle shell 31 are capable of rotating relative to the lower shell 21 accordingly. The four through holes 313 surround the mounting ring 312 and are capable of communicating with the four communicating holes 213.

With reference to FIGS. 5 to 7, 9, 10A, and 10B, the ring burr 32 and the frustoconical burr 33 are mutually rotatable relative to each other, are mounted inside the middle shell 31, and are disposed below the medicine case 12. An interior of the ring burr 32 communicates with the inlet 122 of the medicine case 12 and the interior of the collecting case 22. In the embodiment of the present invention, the ring bur 32 and the frustoconical burr 33 are made of ceramics. The ring burr 32 has a main body 321, a flange 322, two engaging indentations 323, multiple rough grinding teeth 324, and multiple fine grinding teeth 325. The main body 321 of the ring burr 32 is round and tubular and has a first end and a second end disposed opposite each other. The flange 322 is disposed at the first end of the main body 321. Each one of the two engaging indentations 323 is formed in the flange 322 according to a contour of each one of the two engaging blocks 115 of the upper shell 11. The two engaging indentations 323 are diametrically opposite each other on the flange 322. The ring burr 32 is mounted inside the upper shell 11. The two engaging indentations 323 are respectively engaged with the two engaging blocks 115. Therefore, the ring burr 32 is capable of rotating relative to the lower shell 21 together with the upper shell 11 and the middle shell 31. Each one of the rough grinding teeth 324 spirally extends from the first end of the ring burr 32 toward the second end of the ring burr 32. Each one of the fine grinding teeth 325 spirally extends from the rough grinding teeth 324 to the second end of the ring burr 32. A contour of each one of the fine grinding teeth 325 is finer than a contour of each one of the rough grinding teeth 324.

Figure 8:
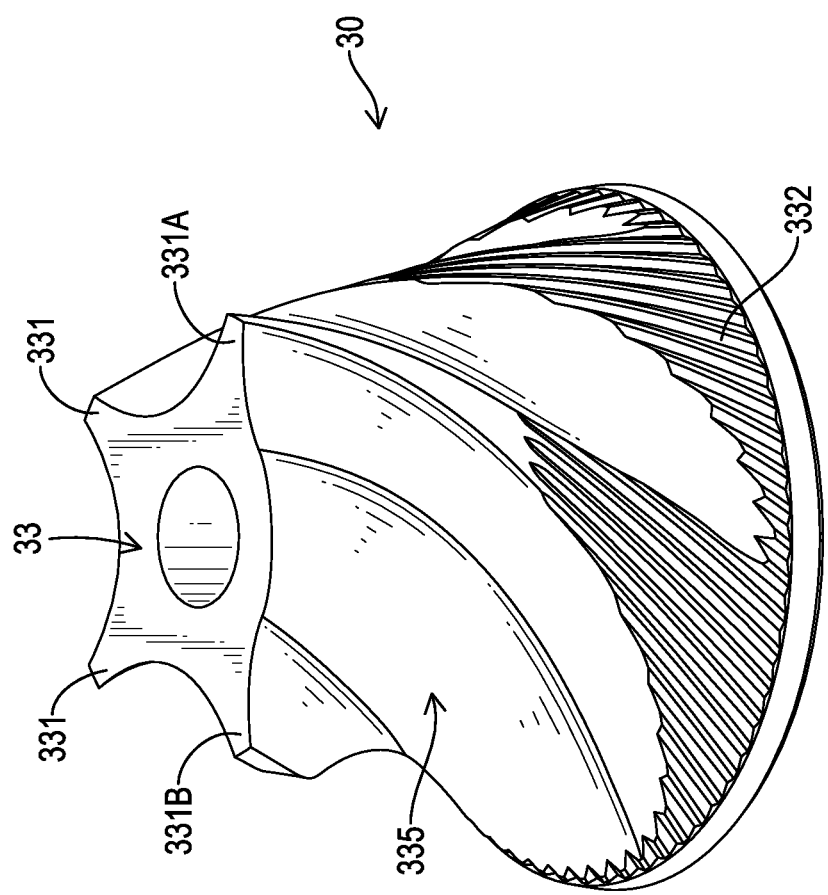
FIG. 8 is an enlarged perspective view of a frustoconical burr of the grinding assembly in FIG. 6.
Figure 9:
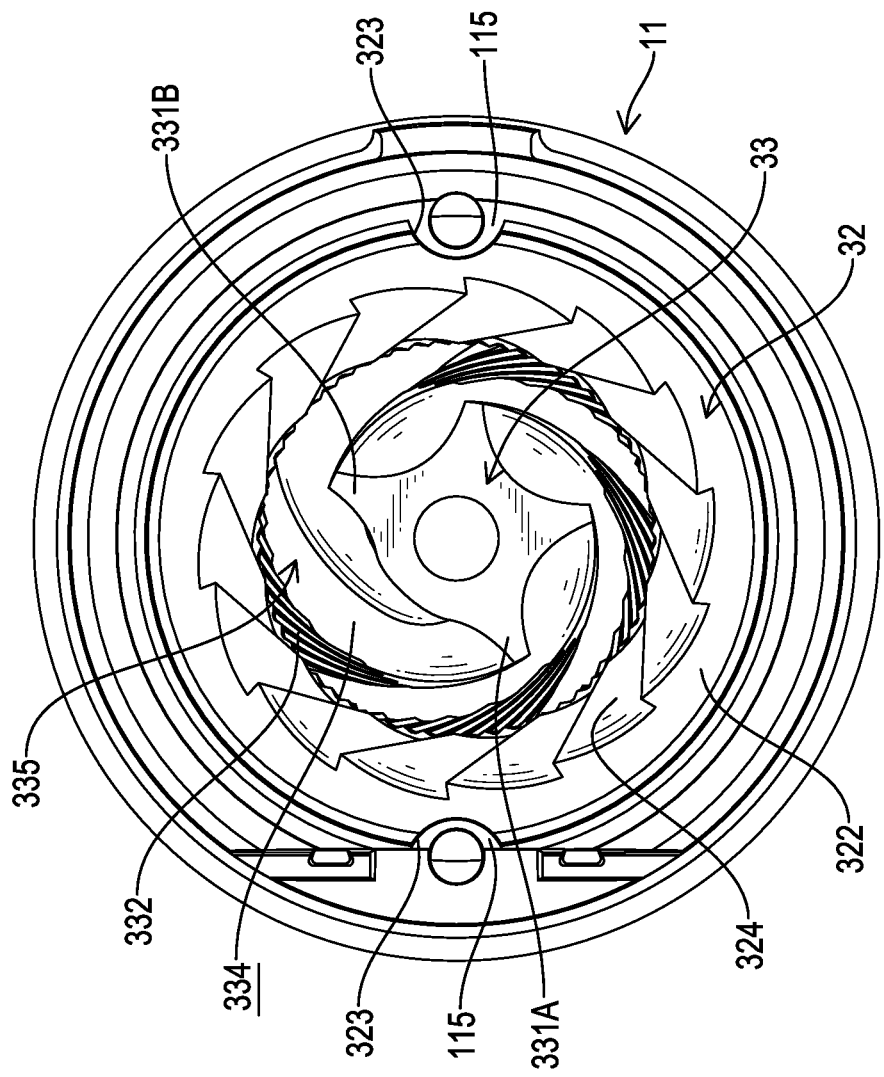
FIG. 9 is a top view of the frustoconical burr and a ring burr of the grinding assembly in FIG. 6.

With reference to FIGS. 5, 6, 8, 10A, and 10B, the frustoconical burr 33 is disposed within the ring burr 32, is detachably connected to the lower shell 21, and is non-rotatable relative to the lower shell 21. The frustoconical burr 33 has multiple rough grinding edges 331, multiple fine grinding edges 332, multiple recesses, an engaging recess 333, and a non-grinding portion 335. The multiple rough grinding edges 331 surround a center of the frustoconical burr 33 at angular intervals and spirally extend. The multiple recesses are divided by the multiple rough grinding edges 332, and have multiple capacities. In the embodiment of the present invention, the multiple rough grinding edges 331 are arranged at uneven angular intervals. With reference to FIG. 8, one of the multiple recesses has a capacity larger than a capacity of any other one of the multiple recesses to define the non-grinding portion 335. The non-grinding portion 335 is disposed between adjacent two rough grinding edges 331A, 331B of the multiple rough grinding edges 331. With reference to FIGS. 8 and 9, when the frustoconical burr 33 is mounted within the ring burr 32, there are multiple receiving spaces 334 formed between the frustoconical burr 33 and the ring burr 32. One of the multiple receiving spaces 334 is larger than each one of the other multiple receiving spaces 334. Each one of the multiple fine grinding edges 332 spirally extends to a bottom of the frustoconical burr 33 and has a contour finer than a contour of each rough grinding edge 331. The engaging recess 333 is defined in the bottom of the frustoconical burr 33. The engaging recess 333 is shaped like a crisscross according to a contour of the engaging block 212 of the lower shell 21. The engaging recess 333 of the frustoconical burr 33 is disposed around the engaging block 212 and is engaged with the engaging block 212 to prevent the frustoconical burr 33 from rotating relative to the lower shell 21.

With reference to FIGS. 5 to 7, 10A, and 10B, the fastener 34 is mounted through the frustoconical burr 33 and the lower shell 21 and make the frustoconical burr 33 and the lower shell 21 detachably connected with each other. The fastener 34 may be a common component for fastening such as a plastic clip, a plastic rivet, or a clip rivet.

With reference to FIGS. 5, 6, 10A, and 10B, the guiding disc 35 is a disc and has a feeding hole 351. The guiding disc 35 is disposed inside the upper shell 11 and is disposed between the medicine case 12 and the ring burr 32. The feeding hole 351 communicates with the inlet 122 of the medicine case 12 and the interior of the ring burr 32.

Figure 10A:
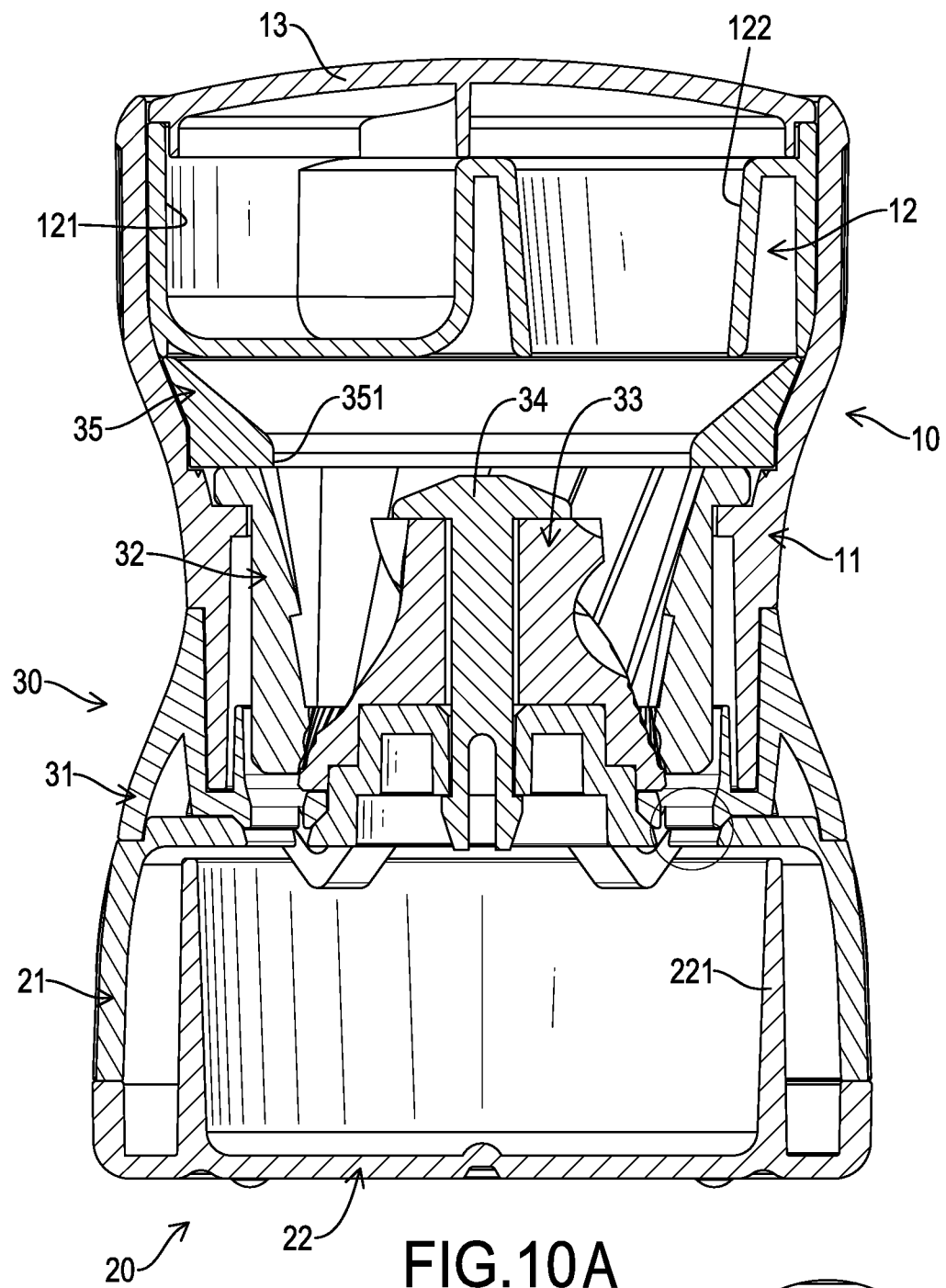
FIG. 10A is a cross sectional side view of the medicine grinder in FIG. 1.
Figure 10B:
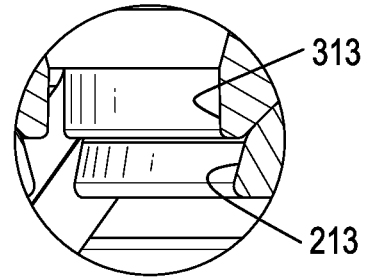
FIG. 10B is a partially enlarged side view of the medicine grinder in FIG. 10A.

With reference to FIGS. 10A and 10B, medicine tablets are stored in the medicine trough 121 of the medicine case 12 before being ground by the medicine grinder in accordance with the present invention. The medicine tablets pass through the medicine trough 121 and drop into the inlet 122 of the medicine case 12. The medicine tablets pass through the inlet 122 and the feeding hole 351 of the guiding disc 35 and then enter the interior of the ring burr 32. The medicine tablets are ground by the ring burr 32 and the frustoconical burr 33 and are turned into medicine powders. The medicine powders pass through the four through holes 313 of the middle shell 31 and the four communicating holes 213 of the lower shell 21 and then enter the collecting portion 221 of the collecting case 22 for collection and storage.

With reference to FIGS. 8 and 9, one of the multiple receiving spaces 334 formed between the frustoconical burr 33 and the ring burr 32 is larger than each one of the other receiving spaces 334. When the medicine tablets inside the ring burr 32 are not completely ground yet, subsequent medicine tablets can be temporarily received in the larger receiving spaces 334. The medicine grinder in accordance with the present invention can receive more medicine tablets, prevent the medicine tablets from blocking the inlet 122, and make sure the medicine tablets be ground in succession.

Moreover, the upper shell 11 and the medicine case 12 can be detachably connected via engagement of the engaging grooves 113 and the engaging ribs 123 of the medicine case 12. The upper shell 11 and the middle shell 31 can be detachably connected via engagement of the locking troughs 114 of the upper shell 11 and the locking blocks 311 of the middle shell 31. The lower shell 21 and the collecting case 22 can be detachably connected via engagement of the engaging recesses 214 of the lower shell 21 and the elastic engaging members 222 of the collecting case 22. Therefore, the medicine grinder in accordance with the present invention is easy to be cleaned and can avoid human body from being negatively influenced by drug interaction of mixed drugs.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A medicine grinder comprising:
    an inlet assembly disposed at a top of the medicine grinder and having an upper shell; and
        a medicine case disposed within the upper shell and having a medicine trough for storing medicines; and
        an inlet formed through a case body of the medicine case; and
    a collecting assembly disposed at a bottom of the medicine grinder and having
        a lower shell; and
        a collecting case covered by the lower shell; and
    a grinding assembly disposed between the inlet assembly and the collecting assembly and having
        a middle shell connected to the upper shell and the lower shell;
        a ring burr being tubular, disposed below the medicine case, and communicating with the inlet and an interior of the collecting case; and
        a frustoconical burr disposed within the ring burr, connected to the lower shell, and having
            multiple rough grinding edges surrounding a center of the frustoconical burr, and each one of the rough grinding edges spirally extending about the center of the frustoconical burr;
            multiple recesses divided by the multiple rough grinding edges; and
            one of the multiple recesses having a capacity larger than a capacity of each one of other of the multiple recesses to define a non-grinding portion.

2. The medicine grinder as claimed in claim 1, wherein the upper shell has
    an upper shell body being tubular and having an inner surface; and
    two engaging protrusions protruding from the inner surface of the upper shell body and being in alignment with each other;
the middle shell is fastened to the upper shell, is connected to the lower shell, and is rotatable relative to the lower shell;
the ring burr has two engaging indentations respectively engaged with the two engaging protrusions of the upper shell; and
the frustoconical burr is fastened to the lower shell.

3. The medicine grinder as claimed in claim 2, wherein the middle shell has
    a middle shell body being tubular; and
    a mounting ring being circular and disposed within the middle shell body;
the lower shell has
    a lower shell body having a top; and
    a positioning pillar being a cylinder and disposed at the top of the lower shell body; and
the mounting ring of the middle shell is mounted around the positioning pillar, and the middle shell is rotatable relative to the lower shell.

4. The medicine grinder as claimed in claim 3, wherein the lower shell has multiple communicating holes defined through the top of the lower shell body, surrounding the positioning pillar, and communicating with the interior of the collecting case; and
the middle shell has multiple through holes surrounding the mounting ring and being capable of communicating with the multiple communicating holes.

5. The medicine grinder as claimed in claim 4, wherein the lower shell has an engaging block protruding from a top surface of the positioning pillar; and
the frustoconical burr has an engaging recess defined in a bottom of the frustoconical burr, mounted around the engaging block, and engaged with the engaging block.

6. The medicine grinder as claimed in claim 5, wherein the upper shell has two engaging grooves;
the upper shell body has an upper opening end and a lower opening end disposed opposite the upper opening end;
the two engaging grooves are disposed within the upper shell body and extend from the upper opening end toward the lower opening end; and
the medicine case has two engaging ribs respectively engaged with the two engaging grooves.

7. The medicine grinder as claimed in claim 6, wherein the upper shell has two locking troughs defined in an outer surface of the upper shell body; and
the middle shell has two locking blocks respectively engaged with the two locking troughs.

8. The medicine grinder as claimed in claim 7, wherein the lower shell has two engaging recesses disposed at a bottom of the lower shell body, defined in an inner surface of the lower shell body, and being diametrically opposite each other on the lower shell body; and
the collecting case has two elastic engaging members being elastic and respectively engaged with the two engaging recesses.

9. The medicine grinder as claimed in claim 1, wherein the ring burr and the frustoconical burr are made of ceramic.

10. The medicine grinder as claimed in claim 2, wherein the ring burr and the frustoconical burr are made of ceramic.

11. The medicine grinder as claimed in claim 3, wherein the ring burr and the frustoconical burr are made of ceramic.

12. The medicine grinder as claimed in claim 4, wherein the ring burr and the frustoconical burr are made of ceramic.

13. The medicine grinder as claimed in claim 5, wherein the ring burr and the frustoconical burr are made of ceramic.

14. The medicine grinder as claimed in claim 6, wherein the ring burr and the frustoconical burr are made of ceramic.

15. The medicine grinder as claimed in claim 9, wherein the inlet assembly has a cover connected to the upper opening end of the upper shell body and being capable of blocking an upper opening of the upper shell.

16. The medicine grinder as claimed in claim 10, wherein the inlet assembly has a cover connected to the upper opening end of the upper shell body and being capable of blocking an upper opening of the upper shell.

17. The medicine grinder as claimed in claim 11, wherein the inlet assembly has a cover connected to the upper opening end of the upper shell body and being capable of blocking an upper opening of the upper shell.

18. The medicine grinder as claimed in claim 12, wherein the inlet assembly has a cover connected to the upper opening end of the upper shell body and being capable of blocking an upper opening of the upper shell.

19. The medicine grinder as claimed in claim 13, wherein the inlet assembly has a cover connected to the upper opening end of the upper shell body and being capable of blocking an upper opening of the upper shell.

20. The medicine grinder as claimed in claim 14, wherein the inlet assembly has a cover connected to the upper opening end of the upper shell body and being capable of blocking an upper opening of the upper shell.

* * * * *